(12) United States Patent
Hirosawa

(10) Patent No.: US 10,510,318 B2
(45) Date of Patent: Dec. 17, 2019

(54) VEHICLE MIRROR SYSTEM

(71) Applicant: TOYOTA JIDOSHA KABUSHIKI KAISHA, Toyota-shi (JP)

(72) Inventor: Yasunori Hirosawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 126 days.

(21) Appl. No.: 15/726,423

(22) Filed: Oct. 6, 2017

(65) Prior Publication Data

US 2018/0151152 A1    May 31, 2018

(30) Foreign Application Priority Data

Nov. 29, 2016   (JP) ................................. 2016-231616

(51) Int. Cl.
  *G09G 5/00*     (2006.01)
  *B60R 1/00*     (2006.01)
  (Continued)

(52) U.S. Cl.
  CPC ............... *G09G 5/006* (2013.01); *B60R 1/00* (2013.01); *B60R 1/12* (2013.01); *G06K 9/78* (2013.01); *B60J 7/12* (2013.01); *B60R 1/04* (2013.01); *B60R 2001/1253* (2013.01); *B60R 2300/303* (2013.01); *B60R 2300/8006* (2013.01);
  (Continued)

(58) Field of Classification Search
  CPC ............. G09G 5/006; G09G 2320/068; G09G 2320/08; G09G 2380/10; B60R 1/00; B60R 1/12; B60R 1/04; B60R 2001/1253; B60R 2300/303; B60R 2300/8006; B60R 2300/8026; B60R 2300/8066; G06K 9/78; B60J 7/12
  See application file for complete search history.

(56) References Cited

U.S. PATENT DOCUMENTS

2006/0029271 A1* 2/2006 Miyoshi .................... G06T 3/00
                                                      382/154
2007/0263902 A1* 11/2007 Higuchi ............... G05D 1/0246
                                                      382/104
(Continued)

FOREIGN PATENT DOCUMENTS

JP       2006-50263 A       2/2006
JP       2007-228448        9/2007
(Continued)

OTHER PUBLICATIONS

Kato, JP2009078597, Apr. 16, 2009 (machine translation).*

*Primary Examiner* — Courtney D Heinle
(74) *Attorney, Agent, or Firm* — Oblon, McClelland, Maier & Neustadt, L.L.P.

(57) ABSTRACT

A vehicle mirror system that includes: an electronic rear-view mirror that is switchable between a display mode in which the electronic rear-view mirror displays, by means of a display component, vehicle rear-view ages captured by an image capturing component provided at a rear portion of the vehicle, and a reflecting mode in which the electronic rear-view mirror shows, by optical reflection, what is behind the vehicle; and a control component that causes switching of the electronic rear-view mirror to either the display mode or the reflecting mode in a case in which a determination criterion relating to a field of view in a rear direction of the vehicle has been met.

14 Claims, 9 Drawing Sheets

(51) Int. Cl.
    *B60R 1/12*         (2006.01)
    *G06K 9/78*        (2006.01)
    *B60J 7/12*         (2006.01)
    *B60R 1/04*         (2006.01)

(52) U.S. Cl.
    CPC ................ *B60R 2300/8066* (2013.01); *G09G 2320/068* (2013.01); *G09G 2320/08* (2013.01); *G09G 2380/10* (2013.01)

(56) References Cited

U.S. PATENT DOCUMENTS

2009/0079585 A1*   3/2009   Chinomi ................... B60R 1/00
                                                                     340/901
2010/0128128 A1*   5/2010   Nagamine ............. B60W 40/02
                                                                       348/148
2016/0337594 A1*  11/2016   Morishita .............. B60K 35/00

FOREIGN PATENT DOCUMENTS

| | | |
|---|---|---|
| JP | 2009-78597 A | 4/2009 |
| JP | 2009-081664 | 4/2009 |
| JP | 2010-128794 A | 6/2010 |
| WO | WO 2015/136894 A1 | 9/2015 |

\* cited by examiner

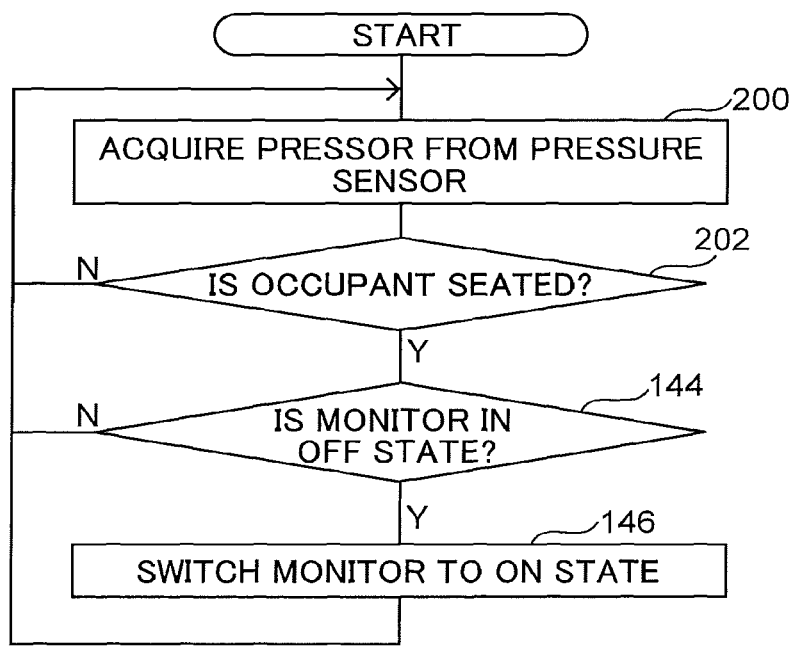
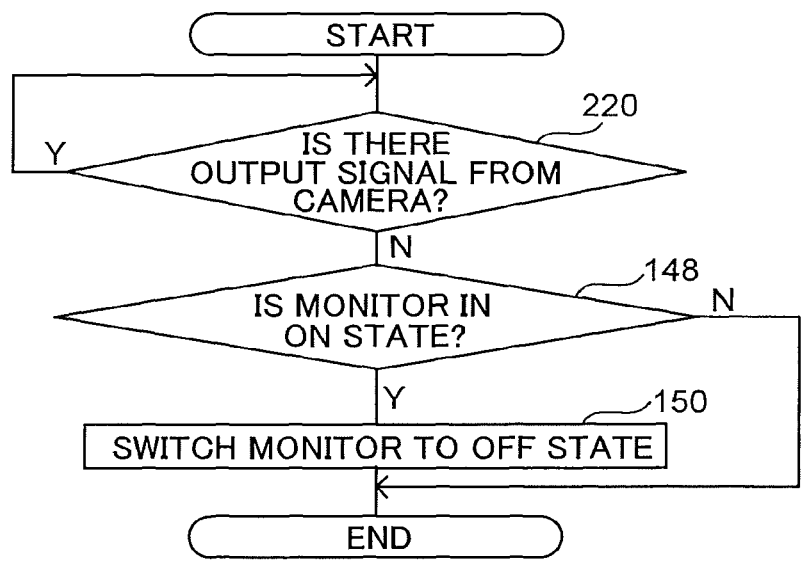

VEHICLE MIRROR SYSTEM

CROSS-REFERENCE TO RELATED APPLICATION

This application is based on and claims priority under 35 USC 119 from Japanese Patent Application No. 2016-231616 filed on Nov. 29, 2016, which is incorporated by reference herein.

BACKGROUND

Technical Field

The present disclosure relates to a vehicle mirror system.

Related Art

Technologies are known which capture, by means of image capturing devices such as cameras provided in a vehicle, images of the surroundings of the host vehicle and display, on a display device provided inside the vehicle, the images obtained by the image capturing.

For example, Japanese Patent Application Laid-open (JP-A) No. 2007-228448 discloses an imaging environment recognition system which, on the basis of shape information of recognition target objects stored in storing means, calculates degrees of distortion and blurring of the recognition target objects and textures in captured images obtained by an image capturing device. This imaging environment recognition system recognizes imaging environments on the basis of the calculated degrees of distortion and blurring.

Furthermore, JP-A No. 2009-081664 discloses a vehicle surroundings monitoring system that displays, on a display device and in an image size corresponding to mirror reflection images of a rear-view mirror, images obtained as a result of an image capturing device capturing images of what is behind the vehicle.

In this connection, there are cases where a display component that displays images obtained by an image capturing device capturing images of what is behind the vehicle is used as the rear-view mirror for the vehicle. Furthermore, there are also cases where a mirror that shows, by optical reflection, what is behind the vehicle is used as the rear-view mirror.

Additionally, depending on the situation of the vehicle, there are cases where it is more convenient to the driver for the rear-view mirror to be in a reflecting mode in which the rear-view mirror shows, by optical reflection, what is behind the vehicle and cases where it is more convenient to the driver for the rear-view mirror to be in a display mode in which vehicle rear-view images are displayed by the display component. Furthermore, for example, in a case where the driver judges the situation and switches, by manual manipulation, the rear-view mirror to either the reflecting mode or the display mode, this ends up being less convenient to the driver.

SUMMARY

The present disclosure has been devised in consideration of the facts described above, and it is an object thereof to switch, in accordance with various circumstances, an electronic rear-view (interior) mirror for a vehicle between a display mode in which it displays, with a display device, vehicle rear-view images and a reflecting mode in which it shows, by optical reflection, what is behind the vehicle.

In order to achieve this object, an aspect is a vehicle mirror system including: an electronic rear-view mirror that is switchable between a display mode in which it displays, by means of a display component, vehicle rear-view images captured by an image capturing component provided in a rear portion of the vehicle and a reflecting mode in which it shows, by optical reflection, what is behind the vehicle; and a control component that performs control that switches the electronic rear-view mirror to either the display mode or the reflecting mode in a case where a determination criterion relating to a field of view in a rear direction of the vehicle has been met.

BRIEF DESCRIPTION OF THE DRAWINGS

FIG. 12 is a flowchart showing an example of a display switching process pertaining to the fourth embodiment; and FIG. 13 is a flowchart showing an example of a display switching process pertaining to the fifth embodiment.

DETAILED DESCRIPTION

Example configurations for implementing the present disclosure will be described in detail below with reference to the drawings.

First Embodiment

Figure 1A:
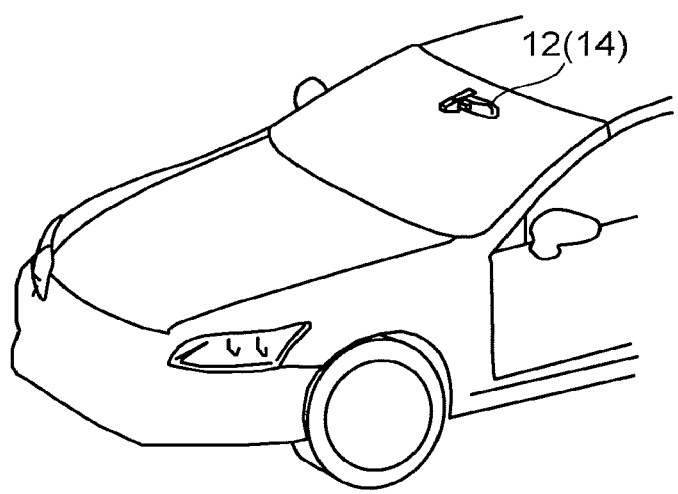
FIG. 1A is a drawing of a front side of a vehicle showing an example of a mounting position of an electronic rear-view mirror pertaining to embodiments.
Figure 1B:
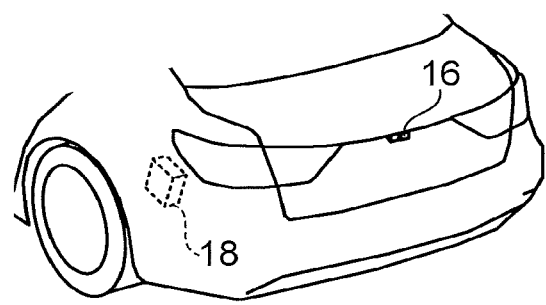
FIG. 1B is a drawing of a rear side of the vehicle showing an example of mounting positions of a camera and a control device pertaining to the embodiments.

As shown in FIG. 1A, in a mirror system pertaining to the present embodiment, a monitor 14 serving as an example of a display component is provided in an electronic rear-view mirror 12. Furthermore, as shown in FIG. 1B, a camera 16 serving as an example of an image capturing component that captures images of what is behind the vehicle is provided in the rear portion of the vehicle. The camera 16 is provided in a trunk in the rear portion of the vehicle, for example. Furthermore, vehicle rear-view images captured by the camera 16 are displayed on the monitor 14.

Figure 2:
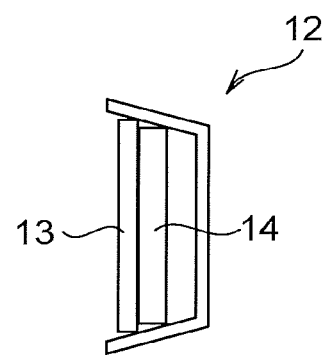
FIG. 2 is a side sectional view showing an example of the configuration of the electronic rear-view mirror pertaining to the embodiments.

As shown in FIG. 2 as an example, the electronic rear-view mirror 12 is configured as a result of a half mirror 13 being provided on the display surface side of the monitor 14. In a case where the display of the monitor 14 is in an on state, the half mirror 13 transmits light representing the images displayed on the monitor 14. In a case where the display of the monitor 14 is in an off state, the half mirror 13 shows, by optical reflection, what is behind the vehicle.

That is, by switching on and off the display of the monitor 14, the electronic rear-view mirror 12 pertaining to the present embodiment is switchable between a display mode in which it displays, by means of the monitor 14, the images captured by the camera 16 and a reflecting mode in which it shows, by optical reflection, what is behind the vehicle.

Furthermore, a control device 18, which is an example of a control component that controls the monitor 14 and the camera 16, is provided inside the trunk. Although an example where the control device 18 is provided inside the trunk is described here, the position where the control device 18 is provided is not limited to this, and the control device 18 may also be provided in another position inside the cabin.

Figure 3:
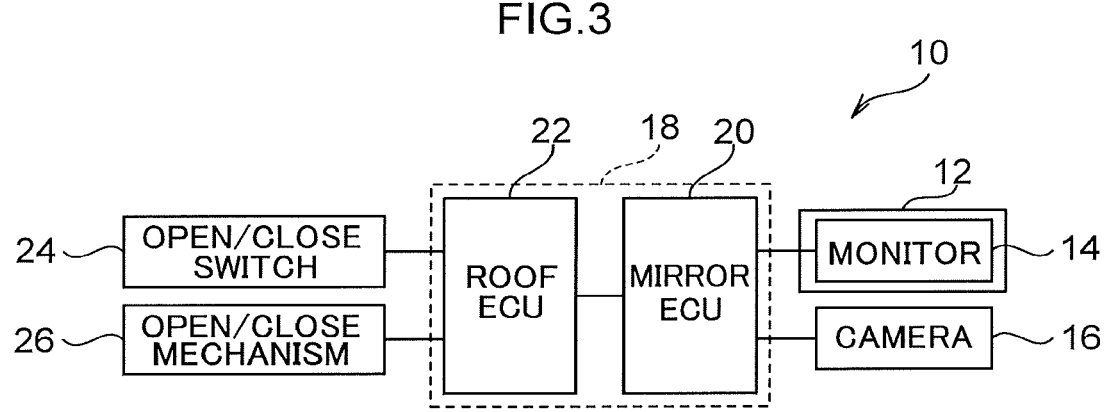
FIG. 3 is a block diagram showing an example of the general configuration of a vehicle mirror system pertaining to first, second, and fifth embodiments.

Next, the electrical configuration of a vehicle mirror system 10 pertaining to the present embodiment will be described with reference to FIG. 3. As shown in FIG. 3, the vehicle mirror system 10 pertaining to the present embodiment is equipped with the electronic rear-view mirror 12, the camera 16, and the control device 18.

The control device 18 is equipped with a mirror electronic control unit (ECU) 20 and a roof ECU 22. Furthermore, the mirror ECU 20 and the roof ECU 22 are interconnected so as to be capable of sending information to and receiving information from each other.

The mirror ECU 20 is configured by a microcomputer including a central processing unit (CPU), a read-only memory (ROM), and a random access memory (RAM). Furthermore, the monitor 14 of the electronic rear-view mirror 12 and the camera 16 are connected to the mirror ECU 20. The camera 16 captures images of what is behind the vehicle at predetermined time intervals and outputs to the mirror ECU 20 image data representing the images obtained by the image capturing.

That is, the mirror ECU 20 performs control that switches on and off the display of the monitor 14, and because of this switching the monitor 14 switches between displaying and not displaying the images captured by the camera 16. In the present embodiment, in the case of displaying on the monitor 14 the images captured by the camera 16, the mirror ECU 20 performs predetermined image processing on the captured images and displays on the display 14 the images that have undergone the image processing.

Examples of the predetermined image processing include mirror image conversion processing that reverses the right and left sides of the images and processing that cuts out, from the images, images in a range serving as a predetermined standard angle of view. For the standard angle of view, an angle of view in a range that satisfies regulations is applied. For example, an angle of view when a range that is about the same as the range appearing in the electronic rear-view mirror 12 in the reflecting mode is displayed on the monitor 14 may be applied as the standard angle of view.

The roof ECU 22 is configured by a microcomputer including a CPU, a ROM, and a RAM. Furthermore, an open/close switch 24 and an open/close mechanism 26 are connected to the roof ECU 22.

Figure 4A:
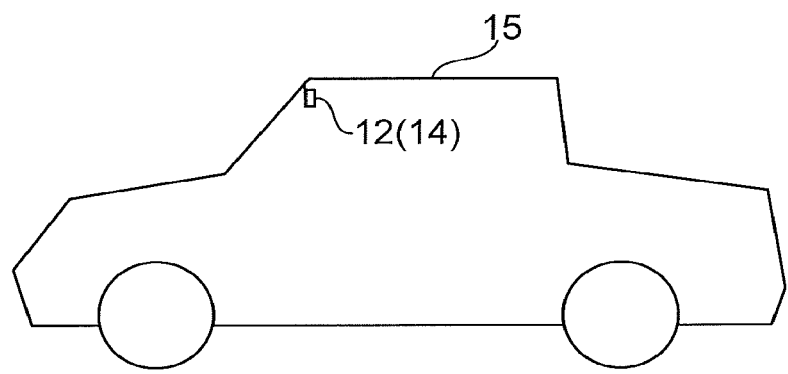
FIG. 4A is a side view showing an example of a configuration of the vehicle in a case where a roof of the vehicle pertaining to the first embodiment is in a closed state.
Figure 4B:
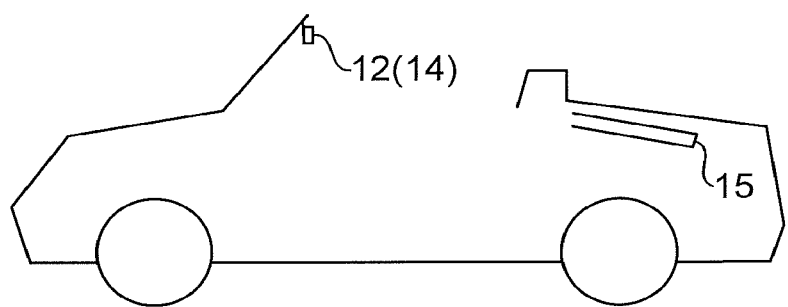
FIG. 4B is a side view showing an example of a configuration of the vehicle in a case where the roof of the vehicle pertaining to the first embodiment is in an open state.

As shown in FIG. 4A and FIG. 4B as an example, the vehicle pertaining to the present embodiment is a vehicle (convertible) whose roof 15 is movable between an open state (the state shown in FIG. 4B) and a closed state (the state shown in FIG. 4A). In the vehicle pertaining to the present embodiment, in a case where the roof 15 is switched from the closed state to the open state, the roof 15 opens from the front side of the vehicle and becomes folded up on the rear side of the vehicle, whereby the roof 15 switches to the open state.

The open/close switch 24 includes a switch that is manipulated when switching the roof 15 of the vehicle between the open state and the closed state. In a case where the open/close switch 24 has been manipulated by an occupant of the vehicle, such as the driver, to switch the roof 15 to the open state, a signal representing an instruction to switch the roof 15 to the open state is input to the roof ECU 22. In a case where the open/close switch 24 has been manipulated by the occupant of the vehicle to switch the roof 15 to the closed state, a signal representing an instruction to switch the roof 15 to the closed state is input to the roof ECU 22.

The open/close mechanism 26 includes a drive component, such as a motor for example, that is controlled by the roof ECU 22. The open/close mechanism 26 uses driving force supplied from the drive component to switch the roof 15 from the closed state to the open state. Furthermore, the open/close mechanism 26 uses driving force supplied from the drive component to switch the roof 15 from the open state to the closed state.

In this connection, in the vehicle pertaining to the present embodiment, in a case where the electronic rear-view mirror 12 is in the reflecting mode and the roof 15 is to be switched from the open state to the closed state, the field of view in the rear direction of the vehicle appearing in the electronic rear-view mirror 12 becomes blocked by the roof 15. Furthermore, in the vehicle pertaining to the present embodiment, in a case where the electronic rear-view mirror 12 is in the reflecting mode and the roof 15 is to be switched from the closed state to the open state, the field of view in the rear direction of the vehicle appearing in the electronic rear-view mirror 12 becomes blocked by the roof 15.

Therefore, the vehicle mirror system 10 pertaining to the present embodiment performs control that switches the electronic rear-view mirror 12 to the display mode in a case where an operation for switching the roof 15 from the open state to the closed state has been started and in a case where an operation for switching the roof 15 from the closed state to the open state has been started. Additionally, the vehicle mirror system 10 performs control that switches the electronic rear-view mirror 12 to the reflecting mode in a case where the operation for switching the roof 15 from the open state to the closed state has been completed and in a case where the operation for switching the roof 15 from the closed state to the open state has been completed.

Figure 5:
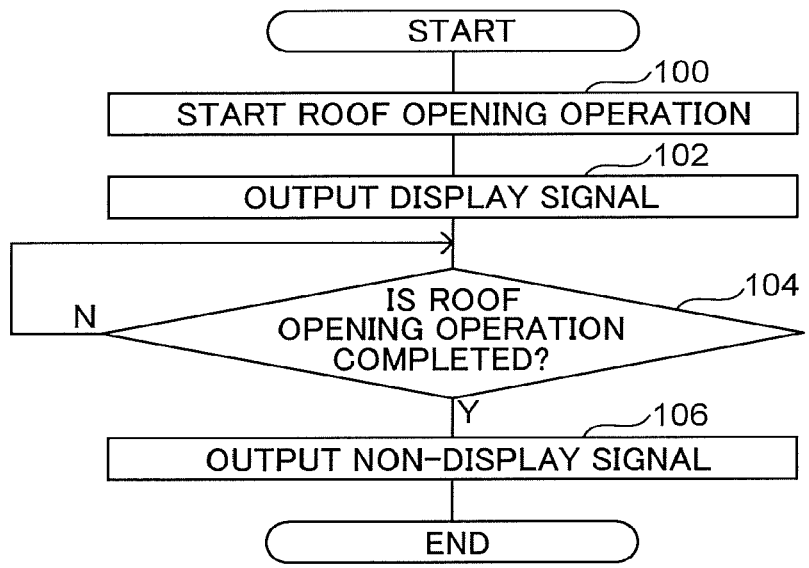
FIG. 5 is a flowchart showing an example of a roof opening operation process pertaining to the first embodiment.

Next, the action of the vehicle mirror system 10 pertaining to the present embodiment will be described with reference to FIG. 5 to FIG. 7. FIG. 5 is a flowchart showing an example of a roof opening operation process executed by the roof ECU 22 pertaining to the present embodiment. Furthermore, in the present embodiment, the roof opening operation process shown in FIG. 5 is executed as a result of the roof ECU 22 executing a program stored beforehand in the ROM. Furthermore, execution of the roof opening operation process shown in FIG. 5 is started, for example, in a case where the open/close switch 24 has been manipulated to switch the roof 15 from the closed state to the open state.

Figure 6:
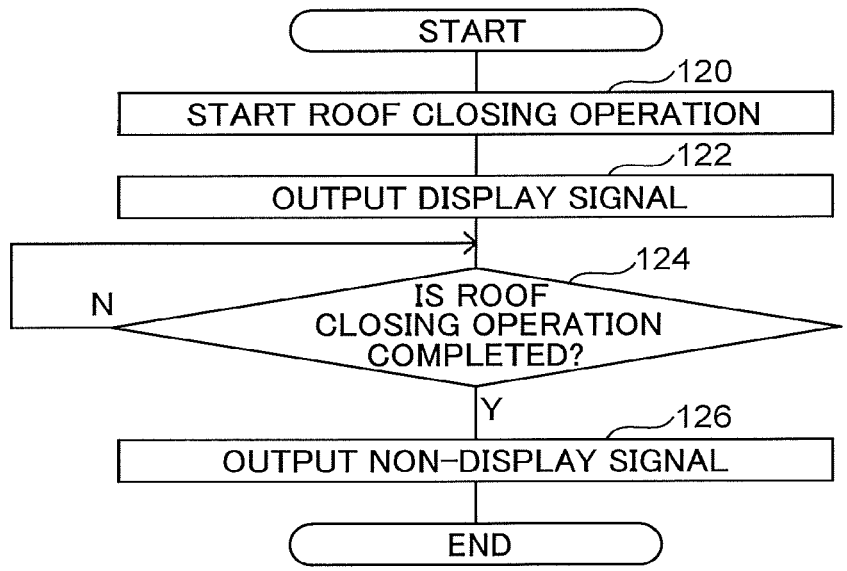
FIG. 6 is a flowchart showing an example of a roof closing operation process pertaining to the first embodiment.

Furthermore, FIG. 6 is a flowchart showing an example of a roof closing operation process executed by the roof ECU 22 pertaining to the present embodiment. Furthermore, in the present embodiment, the roof closing operation process shown in FIG. 6 is executed as a result of the roof ECU 22 executing a program stored beforehand in the ROM. Furthermore, execution of the roof closing operation process shown in FIG. 6 is started, for example, in a case where the open/close switch 24 has been manipulated to switch the roof 15 from the open state to the closed state.

Figure 7:
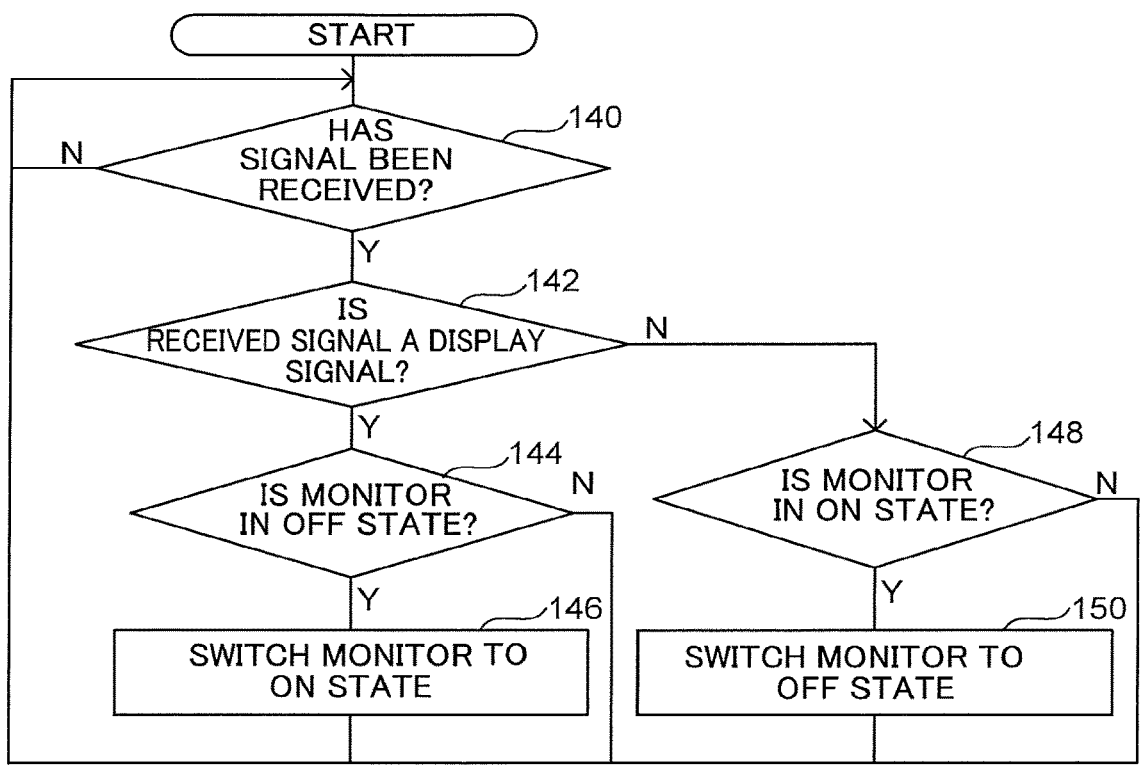
FIG. 7 is a flowchart showing an example of a display switching process pertaining to the first embodiment.

Furthermore, FIG. 7 is a flowchart showing an example of a display switching process executed by the mirror ECU 20 pertaining to the present embodiment. Furthermore, in the present embodiment, the display switching process shown in FIG. 7 is executed as a result of the mirror ECU 20 executing a program stored beforehand in the ROM. Furthermore, execution of the display switching process shown in FIG. 7 is started, for example, in a case where an ignition switch has been switched to an on state.

In step 100 of FIG. 5, the roof ECU 22 controls the open/close mechanism 26 to thereby start the operation for switching the roof 15 of the vehicle from the closed state to the open state. In the next step 102, the roof ECU 22 outputs to the mirror ECU 20 a signal (hereinafter called a "display signal") instructing that the display of the monitor 14 be switched to the on state.

In the next step 104, the roof ECU 22 stands by until the operation for switching the roof 15 to the open state that was started in step 100 is completed. When the operation for switching the roof 15 to the open state that was started in step 100 is completed, the determination in step 104 becomes YES and the process moves to step 106. The completion of the operation for switching the roof 15 to the open state can be detected, for example, using a sensor that detects that the roof 15 has been folded up on the rear side of the vehicle. In the next step 106, the roof ECU 22 outputs to the mirror ECU 20 a signal (hereafter called a "non-display signal") instructing that the display of the monitor 14 be switched to the off state. Thereafter, the roof ECU 22 ends the roof opening operation process.

In step 120 of FIG. 6, the roof ECU 22 controls the open/close mechanism 26 to thereby start the operation for switching the roof 15 of the vehicle from the open state to the closed state. In the next step 122, the roof ECU 22 outputs the display signal to the mirror ECU 20.

In the next step 124, the roof ECU 22 stands by until the operation for switching the roof 15 to the closed state that was started in step 120 is completed. When the operation for switching the roof 15 to the closed state that was started in step 120 is completed, the determination in step 124 becomes YES and the process moves to step 126. The completion of the operation for switching the roof 15 to the closed state can be detected, for example, using a sensor that detects that the roof 15 has been placed in the closed state. In the next step 126, the roof ECU 22 outputs the non-display signal to the mirror ECU 20. Thereafter, the roof ECU 22 ends the roof closing operation process.

In step 140 of FIG. 7, the mirror ECU 20 stands by until it receives a signal output from the roof ECU 22. When the mirror ECU 20 receives a signal output from the roof ECU 22, the determination in step 140 becomes YES and the process moves to step 142. In step 142, the mirror ECU 20 determines whether or not the signal received in step 140 is the display signal. In a case where the determination is YES, the process moves to step 144.

In step 144, the mirror ECU 20 determines whether or not the monitor 14 is in the off state. In a case where the determination is NO, the process returns to step 140. In a case where the determination is YES, the process moves to step 146. In step 146, the mirror ECU 20 switches the display of the monitor 14 to the on state and displays on the monitor 14 the images captured by the camera 16. The electronic rear-view mirror 12 is switched to the display mode by the processing of step 146. When the processing of step 146 ends, the process returns to step 140.

In a case where the determination in step 142 is NO, the mirror ECU 20 takes this to mean that the signal output in step 140 is the non-display signal and the process moves to step 148. In step 148, the mirror ECU 20 determines whether or not the display of the monitor 14 is in the on state. In a case where the determination is NO, the process returns to step 140. In a case where the determination is YES, the process moves to step 150. In step 150, the mirror ECU 20 switches the display of the monitor 14 to the off state. The electronic rear-view mirror 12 is switched to the reflecting mode by the processing of step 150. When the processing of step 150 ends, the process returns to step 140.

As described above, according to the present embodiment, control that switches the electronic rear-view mirror 12 to the display mode is performed in a case where the operation for switching the roof 15 from the closed state to the open state has been started and in a case where the operation for switching the roof 15 from the open state to the closed state has been started. Consequently, the occupant of the vehicle can use the electronic rear-view mirror 12 to check the rear field of view both in a case where the operation for switching the roof 15 from the closed state to the open state has been started and in a case where the operation for switching the roof 15 from the open state to the closed state has been started.

Second Embodiment

A second embodiment of the present disclosure will be described in detail below. It will be noted that the mounting positions of the electronic rear-view mirror 12, the camera 16, and the control device 18 pertaining to the present embodiment are the same (see FIG. 1) as in the first embodiment, so description here will be omitted. Furthermore, the configuration of the electronic rear-view mirror 12 pertaining to the present embodiment is the same (see FIG. 2) as in the first embodiment, so description here will be omitted. Furthermore, the configuration of the vehicle mirror system 10 pertaining to the present embodiment is the same (see FIG. 3) as in the first embodiment, so description here will be omitted.

Figure 8:
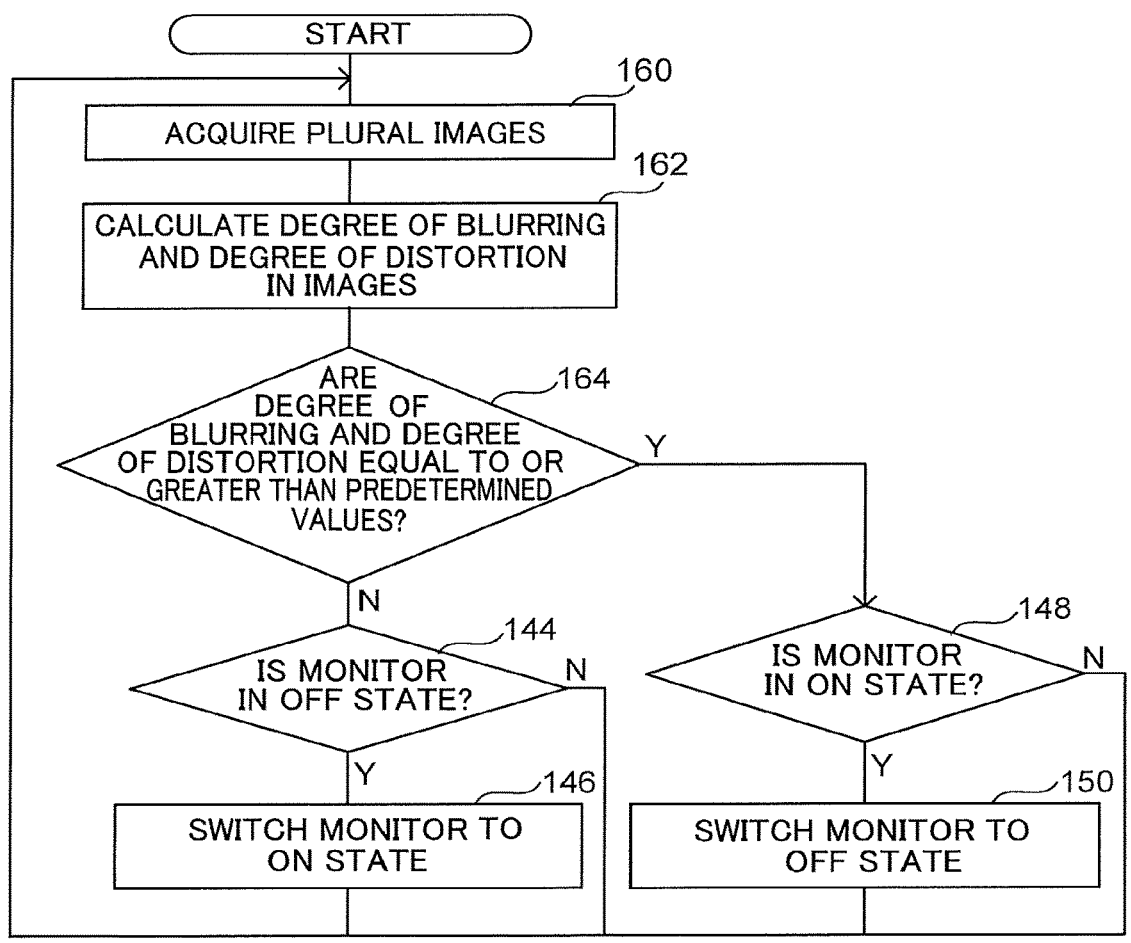
FIG. 8 is a flowchart showing an example of a display switching process pertaining to the second embodiment.

The action of the vehicle mirror system 10 pertaining to the present embodiment will now be described with reference to FIG. 8. FIG. 8 is a flowchart showing an example of a display switching process executed by the mirror ECU 20 pertaining to the present embodiment. Furthermore, in the present embodiment, the display switching process shown in FIG. 8 is executed as a result of the mirror ECU 20 executing a program stored beforehand in the ROM. Furthermore, execution of the display switching process shown n FIG. 8 is started, for example, in a case where the ignition switch has been switched to the on state. Furthermore, regarding steps in FIG. 8 that execute the same processing as in FIG. 7, the same step numbers as in FIG. 7 are assigned thereto and description thereof will be omitted.

In step 160 of FIG. 8, the mirror ECU 20 acquires the image data representing each of the plural images captured at the predetermined time intervals by the camera 16. In the next step 162, the mirror ECU 20 calculates the degree of blurring and the degree of distortion in the images by comparing the plural images represented by the plural sets of image data acquired in step 160. It will be noted that, as the process for calculating the degree of blurring and the degree of distortion in the images, it suffices to use a publicly known process such as the process disclosed in JP-A No. 2007-228448, for example, so description here will be omitted. Furthermore, blurring and distortion in the images occurs, for example, because of dirt, water droplets, and so forth sticking to the camera 16.

In the next step 164, the mirror ECU 20 determines whether or not at least one of the degree of blurring and the degree of distortion in the images calculated in step 162 is equal to or greater than predetermined threshold values. The threshold values may be the same values for both the degree of blurring and the degree of distortion or may be different values. In a case where the determination is NO, the process moves to step 144. In a case where the determination YES, the process moves to step 148.

As described above, according to the present embodiment, control that switches the electronic rear-view mirror 12 to the reflecting mode is performed in a case where at least one of the degree of blurring and the degree of distortion in the images captured by the camera 16 is equal to or greater than the threshold values. Consequently, the occupant of the vehicle can use the electronic rear-view mirror 12 to check, in a state in which it s easier to see, the rear field of view.

Third Embodiment

A third embodiment of the present disclosure will be described in detail below. It will be noted that the mounting positions of the electronic rear-view mirror 12, the camera 16, and the control device 18 pertaining to the present embodiment are the same (see FIG. 1) as in the first embodiment, so description here will be omitted. Furthermore, the configuration of the electronic rear-view mirror 12 pertaining to the present embodiment is the same (see FIG. 2) as in the first embodiment, so description here will be omitted.

Figure 9:
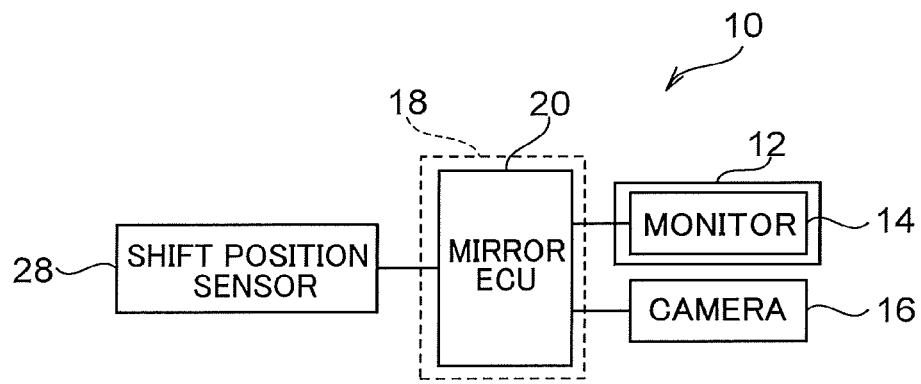
FIG. 9 is a block diagram showing an example of the general configuration of the vehicle mirror system pertaining to a third embodiment.

The electrical configuration of the vehicle mirror system 10 pertaining to the present embodiment will now be described with reference to FIG. 9. It will be noted that regarding configural elements in FIG. 9 that have the same functions as in FIG. 3, the same reference signs as in FIG. 3 will be assigned thereto and description thereof will be omitted. As shown in FIG. 9, the vehicle mirror system 10 pertaining to the present embodiment is equipped with the electronic rear-view mirror 12, the camera 16, the control device 18, and a shift position sensor 28.

The shift position sensor 28 is connected to the mirror ECU 20. Furthermore, the shift position sensor 28 detects the shift position of the vehicle and outputs position information representing the detected shift position to the mirror ECU 20. Examples of the shift position include a reverse position that is selected when causing the vehicle to move backward, a drive position that is selected when causing the vehicle to move forward, and a park position that is selected when parking the vehicle.

Figure 10:
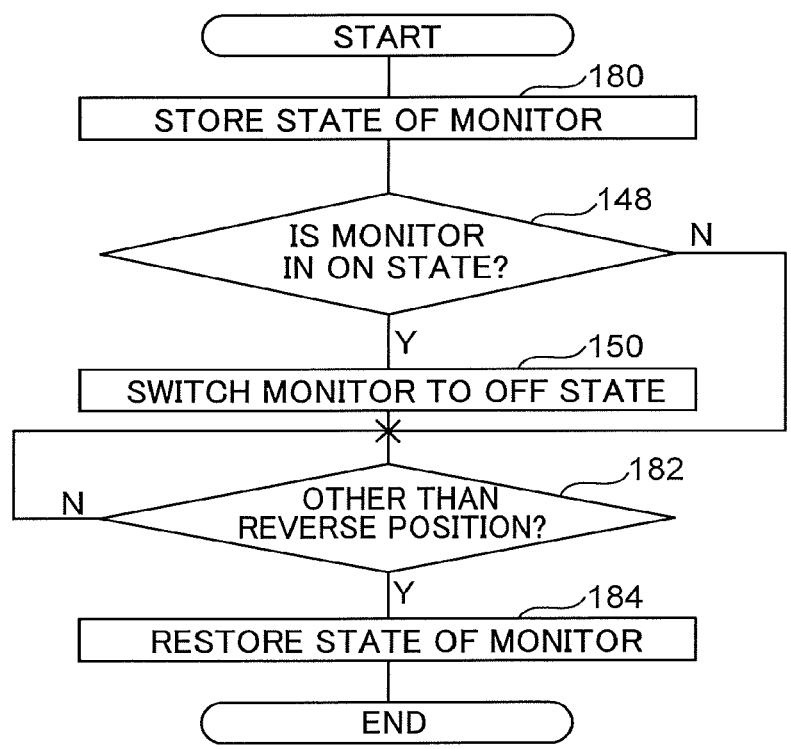
FIG. 10 is a flowchart showing an example of a display switching process pertaining to the third embodiment.

The action of the vehicle mirror system 10 pertaining to the present embodiment will now be described with reference to FIG. 10. FIG. 10 is a flowchart showing an example of a display switching process executed by the mirror ECU 20 pertaining to the present embodiment. Furthermore, in the present embodiment, the display switching process shown in FIG. 10 is executed as a result of the mirror ECU 20 executing a program stored beforehand in the ROM. Furthermore, execution of the display switching process shown in FIG. 10 is started, for example, in a case where the shift position sensor 28 has detected that the reverse position has been selected as the shift position. Furthermore, regarding steps in FIG. 10 that execute the same processing as in FIG. 7, the same step numbers as in FIG. 7 are assigned thereto and description thereof will be omitted.

In step 180 of FIG. 10, the mirror ECU 20 stores in a storage component such as the RAM whether the display of the monitor 14 is in the on state or the off state. When the processing of step 180 ends, the process moves to step 148. When the determination in step 148 is NO, the process moves to step 182. Furthermore, when the processing of step 150 ends, the process moves to step 182.

In step 182, the mirror ECU 20 stands by until the shift position sensor 28 detects that a shift position other than the reverse position has been selected. When a shift position other than the reverse position is selected, the determination of step 182 becomes YES and the process moves to step 184.

In step 184, the mirror ECU 20 restores the display of the monitor 14 to the state stored in step 180. That is, in a case where the state stored in step 180 is the on state, the mirror ECU 20 switches the display of the monitor 14 to the on state. In a case where the state stored in step 180 is the off state, the mirror ECU 20 continues the display of the monitor 14 in the off state. When the processing of step 184 ends, the display switching process ends.

As described above, according to the present embodiment, the electronic rear-view mirror 12 is switched to the reflecting mode in a case where the vehicle moves backward. In the present embodiment, because the electronic rear-view mirror 12 is provided further in the vehicle forward direction than the camera 16, switching the electronic rear-view mirror 12 to the reflecting mode makes the viewing angle wider than switching the electronic rear-view mirror 12 to the display mode. Consequently, it becomes easier for the occupant of the vehicle to grasp what is behind the vehicle. Furthermore, in this case, in a vehicle in which a rear-view monitor is installed, video of the surroundings of the vehicle can be checked by means of the rear-view monitor.

Fourth Embodiment

A fourth embodiment of the present disclosure will be described in detail below. It will be noted that the mounting positions of the electronic rear-view mirror 12, the camera 16, and the control device 18 pertaining to the present embodiment are the same (see FIG. 1) as in the first embodiment, so description here will be omitted. Furthermore, the configuration of the electronic rear-view mirror 12 pertaining to the present embodiment is the same (see FIG. 2) as in the first embodiment, so description here will be omitted.

Figure 11:
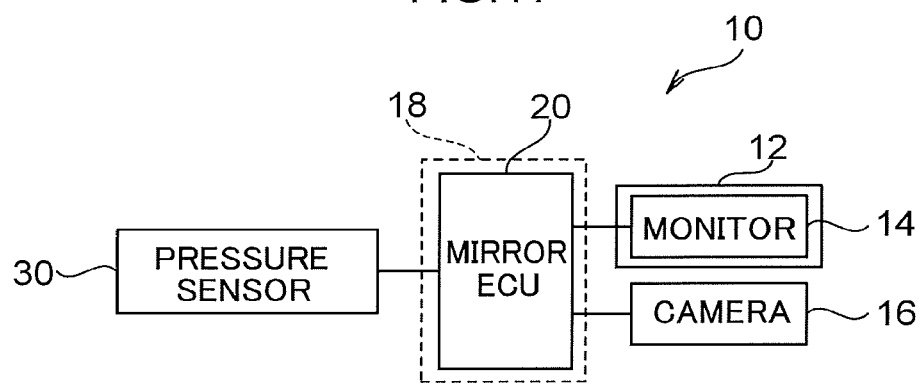
FIG. 11 is a block diagram showing an example of the general configuration of the vehicle mirror system pertaining to a fourth embodiment.

The electrical configuration of the vehicle mirror system 10 pertaining to the present embodiment will now be described with reference to FIG. 11. Regarding configural elements in FIG. 11 that have the same functions as in FIG. 3, the same reference signs as in FIG. 3 will be assigned thereto and description thereof will be omitted. As shown in FIG. 11, the vehicle mirror system 10 pertaining to the present embodiment is equipped with the electronic rear-view mirror 12, the camera 16, the control device 18, and a pressure sensor 30.

The pressure sensor 30 is connected to the mirror ECU 20. Furthermore, the pressure sensor 30 is provided in the seat back and the seat cushion of a rear seat of the vehicle, detects pressure acting on the pressure sensor 30, and outputs the detected pressure to the mirror ECU 20. The mirror ECU 20 determines that an occupant is seated in the rear seat of the vehicle in a case where the pressure input from the pressure sensor 30 is equal to or greater than a threshold value determined beforehand as a lower limit value of a value in a case where an occupant is seated in the rear seat of the vehicle.

The action of the vehicle mirror system 10 pertaining to the present embodiment will now be described with reference to FIG. 12. FIG. 12 is a flowchart showing an example of a display switching process executed by the mirror ECU 20 pertaining to the present embodiment. Furthermore, in the present embodiment, the display switching process shown in FIG. 12 is executed as a result of the mirror ECU 20 executing a program stored beforehand in the ROM. Furthermore, execution of the display switching process shown in FIG. 12 is started, for example, in a case where the ignition switch has been switched to the on state. Furthermore, regarding steps in FIG. 12 that execute the same processing as in FIG. 7, the same step numbers as in FIG. 7 are assigned thereto and description thereof will be omitted.

In step 200 of FIG. 12, the mirror ECU 20 acquires the pressure output from the pressure sensor 30. In the next step 202, the mirror ECU 20 determines whether or not an occupant is seated in the rear seat of the vehicle by determining whether or not the pressure acquired in step 200 is equal to or greater than the predetermined threshold value. In a case where the determination is NO, the process returns to step 200. In a case where the determination is YES, the process moves to step 144.

As described above, according to the present embodiment, control that switches the electronic rear-view mirror 12 to the display state is performed in a case where it has been detected that an occupant is seated in the rear seat of the vehicle. Consequently, the occupant of the vehicle can use the electronic rear-view mirror 12 to check, in a state in which it is easier to see, the rear field of view.

In the present embodiment a case was described where the pressure sensor 30 is used to detect that an occupant is seated in the rear seat of the vehicle, but the embodiment is not limited to this. For example, the embodiment may also be configured to use other means such as a weight sensor to detect that an occupant is seated in the rear seat of the vehicle.

Fifth Embodiment

A fifth embodiment of the present disclosure will be described in detail below. It will be noted that the mounting positions of the electronic rear-view mirror 12, the camera 16, and the control device 18 pertaining to the present embodiment are the same (see FIG. 1) as in the first embodiment, so description here will be omitted. Furthermore, the configuration of the electronic rear-view mirror 12 pertaining to the present embodiment is the same (see FIG. 2) as in the first embodiment, so description here will be omitted. Furthermore, the configuration of the vehicle mirror system 10 pertaining to the present embodiment is the same (see FIG. 3) as in the first embodiment, so description here will be omitted.

The action of the vehicle mirror system 10 pertaining to the present embodiment will now be described with reference to FIG. 13. FIG. 13 is a flowchart showing an example of a display switching process executed by the mirror ECU 20 pertaining to the present embodiment. Furthermore, in the present embodiment, the display switching process shown in FIG. 13 is executed as a result of the mirror ECU 20 executing a program stored beforehand in the ROM. Furthermore, execution of the display switching process shown FIG. 13 is started, for example, in a case where the ignition switch has been switched to the on state. Furthermore, regarding steps in FIG. 13 that execute the same processing as in FIG. 7, the same step numbers as in FIG. 7 are assigned thereto and description thereof will be omitted.

In step 220 of FIG. 13, the mirror ECU 20 determines whether or not signals corresponding to the image data representing the images captured by the camera 16 are being output from the camera 16. In a case where the determination is YES, the processing of step 220 is repeatedly executed. When the determination becomes NO, the process moves to step 148.

As described above, according to the present embodiment, in a case where signals corresponding to the image data representing the images captured by the camera 16 are not output from the camera 16, control that switches the electronic rear-view mirror 12 to the reflecting mode is performed. Consequently, the occupant of the vehicle can use the electronic rear-view mirror 12 to check the rear field of view.

It will be noted that two or more of the above embodiments may also be combined. In this case, the electronic rear-view mirror 12 may be switched to either the display mode or the reflecting mode in accordance with a predetermined priority level in a case where both a determination criterion for switching the electronic rear-view mirror 12 to the display mode and a determination criterion for switching the electronic rear-view mirror 12 to the reflecting mode have been met. Furthermore, the priority level in this case may be settable by the occupant of the vehicle.

Namely, in a case where it has been simultaneously determined to switch the electronic rear-view mirror 12 to the different modes of the display mode and the reflecting mode as a result of two determination criteria having been met, priority may be given to switching the electronic rear-view mirror 12 to the mode with which the occupant can more reliably see what is behind the vehicle. Specifically, priority may be given to the display mode in a case where the image data from the camera 16 are normal, and priority may be given to the reflecting mode in a case where the image data are abnormal such as when blurring has occurred, distortion has occurred, or the image data from the camera 16 are not output.

More specifically, for example, the electronic rear-view mirror 12 may be switched to the reflecting mode in a case where the operation for switching the roof 15 of the vehicle from the closed state to the open state has been started and at least one of the degree of blurring and the degree of distortion in the images is equal to or greater than the predetermined threshold values. Furthermore, for example, the electronic rear-view mirror 12 may be switched to the reflecting mode in a case where the operation for switching the roof 15 of the vehicle from the open state to the closed state has been started and at least one of the degree of blurring and the degree of distortion in the images is equal to or greater than the predetermined threshold values.

Furthermore, for example, the electronic rear-view mirror 12 may be switched to the reflecting mode in a case where the operation for switching the roof 15 of the vehicle from the closed state to the open state has been started and the image data representing the images captured by the camera 16 are not output from the camera 16. Furthermore, for example, the electronic rear-view mirror 12 may be switched to the reflecting mode in a case where at least one of the degree of blurring and the degree of distortion in the images is equal to or greater than the predetermined threshold values and an occupant is seated in the rear seat of the vehicle. Furthermore, for example, the electronic rear-view mirror 12 may be switched to the reflecting mode in a case where an occupant is seated in the rear seat of the vehicle and the image data representing the images captured by the camera 16 are not output from the camera 16.

Furthermore, for example, the electronic rear-view mirror 12 may be switched to the display mode in a case where the operation for switching the roof 15 of the vehicle from the closed state to the open state has been started and the vehicle moves backward. Furthermore, the electronic rear-view mirror 12 may be switched to the display mode in a case where the vehicle moves backward and an occupant is seated in the rear seat of the vehicle.

Furthermore, the processes performed by the mirror ECU 20 in the above embodiments have been described as software processes performed by executing programs, but the processes may also be performed by hardware. Furthermore, the processes performed by the mirror ECU 20 may also be processes performed by a combination of software and hardware. Furthermore, the programs stored in the ROM may also be stored in and distributed by various types of storage media. The storage media may be non-transitory storage media.

Furthermore, in the above embodiments, an example was described where the mirror ECU 20 is configured by a single microcomputer, but the embodiments are not limited to this. Any of the functions of the mirror ECU 20 may also be included in another ECU.

Moreover, the present disclosure is not limited to the example configurations described above and, in addition to the example configurations described above, can also be modified and implemented in various ways to the extent that they do not depart from the spirit thereof.

In order to achieve this object, a first aspect is a vehicle mirror system including: an electronic rear-view mirror that is switchable between a display mode in which it displays, by means of a display component, vehicle rear-view images captured by an image capturing component provided in a rear portion of the vehicle and a reflecting mode in which it shows, by optical reflection, what is behind the vehicle; and a control component that performs control that switches the electronic rear-view mirror to either the display mode or the reflecting mode in a case where a determination criterion relating to a field of view in a rear direction of the vehicle has been met.

According to the first aspect, in a case where the determination criterion relating to the field of view in the rear direction of the vehicle has been met, the electronic rear-view mirror is switched by the control component to either the display mode in which it displays, by means of the display component, the images captured by the image capturing component that captures images of what is behind the vehicle and the reflecting mode in which it shows, by optical reflection, what is behind the vehicle. Consequently, the electronic rear-view mirror for a vehicle can be switched, in accordance with various circumstances, between the display mode in which it displays, by means of the display component, vehicle rear-view images and the reflecting mode in which it shows, by optical reflection, what is behind the vehicle.

A second aspect includes the first aspect, wherein the vehicle is a vehicle whose roof can be opened and closed, and the control component performs control that switches the electronic rear-view mirror to the display mode in a case where an operation for switching the roof of the vehicle from a closed state to an open state has been started and in a case where an operation for switching the roof of the vehicle from an open state to a closed state has been started. Consequently, the occupant of the vehicle can use the electronic rear-view mirror to check the rear field of view in at least one of a case where the operation for switching the roof of the vehicle to the open state has been started and a case where the operation for switching the roof of the vehicle to the closed state has been started. It will be noted that the at least one of a case where the operation for switching the roof of the vehicle from the closed state to the open state has been started and a case where the operation for switching the roof of the vehicle from the open state to the closed state has been started corresponds to the case where the determination criterion has been met.

Furthermore, a third aspect includes the first aspect, wherein the control component calculates, using plural images obtained as a result of image capturing having been performed plural times at predetermined time intervals by the image capturing component, a degree of blurring and a degree of distortion in the images and, in a case where at least one of the calculated degree of blurring and degree of distortion is equal to or greater than a predetermined threshold value, performs control that switches the electronic rear-view mirror to the reflecting mode. Consequently, the occupant of the vehicle can use the electronic rear-view mirror to check, in a state in which it is easier to see, the rear field of view. It will be noted that the case where at least one of the calculated degree of blurring and degree of distortion is equal to or greater than the predetermined threshold value corresponds to the case where the determination criterion has been met.

Furthermore, a fourth aspect includes the first aspect, wherein the control component performs control that switches the electronic rear-view mirror to the reflecting mode in a case where the vehicle moves backward. Consequently, it becomes easier for the occupant of the vehicle to grasp what is behind the vehicle. It will be noted that the case where the vehicle moves backward corresponds to the case where the determination criterion has been met.

Furthermore, a fifth aspect includes the first aspect, wherein the control component performs control that switches the electronic rear-view mirror to the display mode in a case where an occupant is seated in a rear seat of the vehicle. Consequently, the occupant of the vehicle can use the electronic rear-view mirror to check, in a state in which it is easier to see, the rear field of view. It will be noted that the case where an occupant is seated in the rear seat of the vehicle corresponds to the case where the determination criterion has been met.

Furthermore, a sixth aspect includes the first aspect, wherein the control component performs control that switches the electronic rear-view mirror to the reflecting mode in a case where image data representing images captured by the image capturing component are not output from the image capturing component. Consequently, the occupant of the vehicle can use the electronic rear-view mirror to check the rear field of view. It will be noted that the case where image data representing images captured by the image capturing component are not output from the image capturing component corresponds to the case where the determination criterion has been met.

As described above, according to the present disclosure, there is obtained the effect that the electronic rear-view mirror for a vehicle can be switched, in accordance with various circumstances, between the display mode in which it displays, by means of the display component, vehicle rear-view images and the reflecting mode in which it shows, by optical reflection, what is behind the vehicle.

What is claimed is:

1. A vehicle mirror system comprising:
    an electronic rear-view mirror that is switchable between a display mode in which the electronic rear-view mirror displays, by means of a display component, vehicle rear-view images captured by an image capturing component provided at a rear portion of the vehicle, and a reflecting mode in which the electronic rear-view mirror shows, by optical reflection, what is behind the vehicle; and
    circuitry configured to cause switching of the electronic rear-view mirror to either the display mode or the reflecting mode in a case in which a determination criterion relating to a field of view in a rear direction of the vehicle has been met,
    wherein the vehicle is a vehicle having a roof that can be in an opened state and a closed state, and
    wherein the circuitry is configured to cause switching of the electronic rear-view mirror from the display mode to the reflecting mode in case switching of the roof from the closed state to the opened state has been completed and in case the switching of the roof from the opened state to the closed state has been completed.

2. The vehicle mirror system of claim 1, wherein:
    the circuitry is configured to cause switching of the electronic rear-view mirror to the display mode in a case in which an operation for switching the roof of the vehicle from a closed state to an open state has been started and in a case in which an operation for switching the roof of the vehicle from an open state to a closed state has been started.

3. The vehicle mirror system of claim 1, wherein the circuitry is configured to calculate, using plural images obtained as a result of image capturing having been performed plural times at predetermined time intervals by the image capturing component, a degree of blurring and a degree of distortion in the images and, in a case in which at least one of the calculated degree of blurring or degree of distortion is equal to or greater than a predetermined threshold value, causes switching of the electronic rear-view mirror to the reflecting mode.

4. The vehicle mirror system of claim 1, wherein the circuitry is configured to cause switching of the electronic rear-view mirror to the reflecting mode in a case in which the vehicle moves backward.

5. The vehicle mirror system of claim 1, wherein the circuitry is configured to cause switching of the electronic rear-view mirror to the display mode in a case in which an occupant is seated in a rear seat of the vehicle.

6. The vehicle mirror system of claim 1, wherein the circuitry is configured to cause switching of the electronic rear-view mirror to the reflecting mode in a case in which image data representing images captured by the image capturing component is not output from the image capturing component.

7. A non-transitory recording medium storing a program that is executable by a computer to perform a process, the process comprising:
    switching an electronic rear-view mirror to either a display mode or a reflecting mode in a case in which a determination criterion relating to a field of view in a rear direction of a vehicle has been met,
    wherein
    the display mode displays, by means of a display component, vehicle rear-view images captured by an image capturing component provided at a rear portion of the vehicle,
    the reflecting mode shows, by optical reflection, what is behind the vehicle,
    the vehicle is a vehicle having a roof that can be in an opened state and a closed state, and
    circuitry is configured to cause switching of the electronic rear-view mirror from the display mode to the reflecting mode in case switching of the roof from the closed state to the opened state has been completed and in case the switching of the roof from the opened state to the closed state has been completed.

8. The non-transitory recording medium of claim 7, wherein
    the process includes switching the electronic rear-view mirror to the display mode in a case in which an operation for switching the roof of the vehicle from a closed state to an open state has been started and in a case in which an operation for switching the roof of the vehicle from an open state to a closed state has been started.

9. The non-transitory recording medium of claim 7, wherein the process includes calculating, using plural images obtained as a result of image capturing having been performed plural times at predetermined time intervals by the image capturing component, a degree of blurring and a degree of distortion in the images and, in a case in which at least one of the calculated degree of blurring or degree of distortion is equal to or greater than a predetermined threshold value, switching the electronic rear-view mirror to the reflecting mode.

10. The non-transitory recording medium of claim 7, wherein the process includes switching the electronic rear-view mirror to the reflecting mode in a case in which the vehicle moves backward.

11. The non-transitory recording medium of claim 7, wherein the process includes switching the electronic rear-view mirror to the display mode in a case in which an occupant is seated in a rear seat of the vehicle.

12. The non-transitory recording medium of claim 7, wherein the process includes switching the electronic rear-view mirror to the reflecting mode in a case in which image data representing images captured by the image capturing component is not output from the image capturing component.

13. A vehicle mirror system comprising:
    an electronic rear-view mirror that is switchable between a display mode in which the electronic rear-view mirror displays, by means of a display component, vehicle rear-view images captured by an image capturing component provided at a rear portion of the vehicle, and a reflecting mode in which the electronic rear-view mirror shows, by optical reflection, what is behind the vehicle; and
    circuitry configured to cause switching of the electronic rear-view mirror to either the display mode or the reflecting mode in a case in which a determination criterion relating to a field of view in a rear direction of the vehicle has been met, wherein the circuitry is configured to cause switching of the electronic rear-view mirror to the reflecting mode in a case in which the vehicle moves backward.

14. A non-transitory recording medium storing a program that is executable by a computer to perform a process, the process comprising:

switching an electronic rear-view mirror to either a display mode or a reflecting mode in a case in which a determination criterion relating to a field of view in a rear direction of a vehicle has been met, wherein the display mode displays, by means of a display component, vehicle rear-view images captured by an image capturing component provided at a rear portion of the vehicle, the reflecting mode shows, by optical reflection, what is behind the vehicle, and the process includes switching the electronic rear-view mirror to the reflecting mode in a case in which the vehicle moves backward.

* * * * *